UNITED STATES PATENT OFFICE.

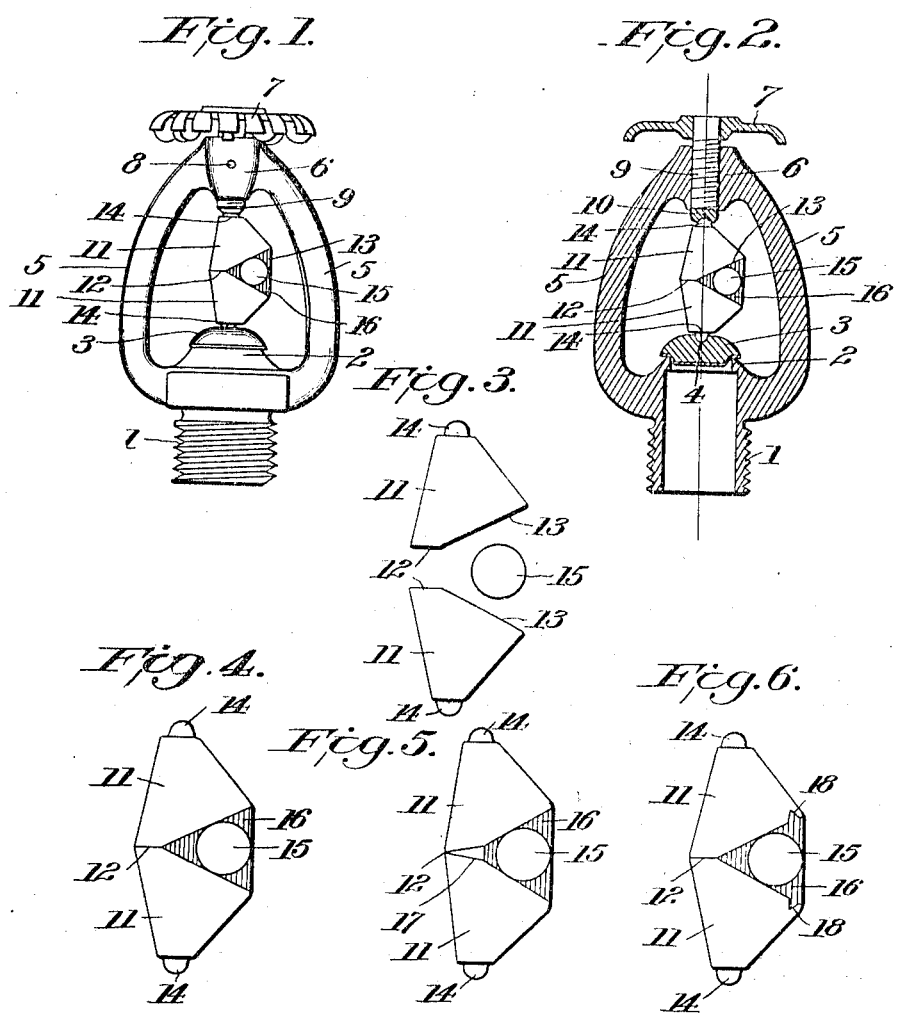

JOHN J. DALY, OF NEW BRUNSWICK, NEW JERSEY, ASSIGNOR TO PATRICK J. QUILTY, OF NEWARK, NEW JERSEY; CATHERINE QUILTY ADMINISTRATRIX OF SAID PATRICK J. QUILTY, DECEASED.

SPRINKLER-HEAD FOR FIRE-EXTINGUISHERS

1,051,865. Specification of Letters Patent. Patented Feb. 4, 1913.

Application filed May 18, 1912. Serial No. 698,270.

*To all whom it may concern:*

Be it known that I, JOHN J. DALY, a citizen of the United States, residing at New Brunswick, in the county of Middlesex and State of New Jersey, have invented a certain new and useful Improvement in Sprinkler-Heads for Fire-Extinguishers, of which the following is a full, clear, and exact description.

Sprinkler heads, for stationary fire extinguishing systems, ordinarily comprise a valve seated on the water discharge nipple by means of some sort of strut made up of separable parts held together by solder which is fusible at a predetermined dangerous temperature, and held in place while the solder is unaffected by heat by means of a tension screw or adjusting screw which may or may not be connected with the superposed distributer. Many different forms of such separable struts have been patented, and these have operated with more or less efficiency. I have found that a strut which might operate merely by the fusing of the solder connecting its parts, is made more efficient if a sort of kick-off or cast-off device is interposed in the solder-joint to insure the separation or collapse of the strut and the release of the valve, and it is the object of this invention to provide a sprinkler head with a strut having such a kick-off or cast-off medium in addition to the solder joint, and preferably applied in the solder joint so as to become immediately effective upon the fusing of the joint.

In the preferred form of construction, herein used in illustration of my invention, I have made the strut with its meeting edges and its solder joint out of line with the points of contact of the ends of the strut with the valve and the tension screw, respectively, so that the pressure of the water upon the melting of the solder joint may be exerted to separate the parts of the strut and thus permit the opening of the valve; and in order to insure such a separation of the strut and the opening of the valve, I have interposed in the solder joint located on the opposite side of said line of contact, a roller member which will act as a kick-off or cast-off, all as I will proceed now to explain and finally claim.

In the accompanying drawings illustrating the invention, in the several figures of which like parts are similarly designated, Figure 1 is an elevation showing the parts in position of use. Fig. 2 shows the head in longitudinal section, and the strut in elevation, in closed position. Fig. 3 is an elevation showing the three parts of the strut detached. Fig. 4 is an elevation showing the strut detached and ready for application. Fig. 5 is an elevation showing a modification of the strut, and Fig. 6 is a similar view showing another modification of the strut.

The sprinkler head may comprise a threaded nipple 1, to be screwed into a service pipe, and this nipple is provided with a valve seat 2, upon which is loosely placed the detachable valve 3, of any approved construction, but preferably with the socket 4 in its top to receive one end of the strut. A pair of arms 5 extends upwardly from the nipple, and these arms are united in a screwthreaded socket 6, into which is screwed the distributer 7, which may be held in place, when it is set or adjusted on the strut, by means of a pin or other device 8. The point of the screw 9 of the distributer also has a socket 10 to receive the upper end of the strut.

The strut comprises similar halves 11, having contact surfaces 12, and opposite these contact surfaces the halves are flared as at 13, and each half has a terminal rounded tongue 14 to seat or be stepped in the sockets 4 and 10 respectively of the valve and screw; and these tongues are arranged so that they will be in a line drawn centrally through the screw and valve so that the thrust of the seating screw which holds the strut in place will be in a single direct line. These strut members 11 are, in general terms, frustums of triangles in outline, so that the opposite sides of these triangles are out of line with the line of thrust; or, in other words, so that their points of contact 12 will be to one side of such line and the greater portions of their flared surfaces will be on the opposite side thereof, and so that if the opposite flared edges are unsupported the pressure exerted in the line of thrust will serve to separate the strut members. The space between the adjacent flared edges of the strut members when they are assembled is filled with a suitable solder fusible at a predetermined temperature, and this solder serves to support the strut members; but such support might not be adequate under all circumstances, and hence I introduce into the solder and between the flared edges and in contact with them, a circular roller 15. While this circular roller acts as a support during the time the fusible solder retains its integrity, a principal object of its use is to serve as a kick-off or cast-off during the time that the solder is fusing to insure the separation of the strut members under the pressure of the water against the valve; and being located out of the line of thrust on the terminal bearings its efficiency in this particular is enhanced. The solder is indicated at 16. Preferably it does not extend onto the contact surfaces 12.

As shown in Fig. 5 the contact surfaces may be a point only in each half of the strut; or in other words, these contact surfaces may be flared at a smaller angle, as at 17, than the remainder of the flaring surfaces; and the solder joint may or may not extend into this smaller flared surface.

As shown in Fig. 6, the flared surfaces may be provided with cavities 18 into which the solder may enter so as to give it a greater hold on the strut members, and avoid any necessity there may be for treating the strut members to receive the solder.

Of course, it is to be understood that the cavities shown in Fig. 6 may be applied in any of the various forms of struts herein shown and described.

I am aware that it is not broadly new to interpose in a strut for use in sprinkler heads a device that will aid in separating the parts of the strut, and that rollers and balls have been so used, but I am not aware of any construction of strut provided with a kick-off or cast-off member such as herein shown and described.

What I claim is:—

1. A sprinkler head for fire extinguishers, having a valve and a distributer arranged opposite one another, an adjusting screw, a separable strut interposed between the valve and the adjusting screw and having contact surfaces out of the direct line of thrust between the adjusting screw and valve, and also having a flared opening on the side opposite the contact surfaces, and a kick-off or cast-off member interposed in said fl opening and out of said line of thrust and adapted to be held in place in said opening by fusible material and arranged to aid in the separation of the strut upon the fusing of the joint.

2. A sprinkler head for fire extinguishers, having a valved nipple, a distributer, an adjusting screw arranged opposite the valved nipple, a separable strut composed of like halves interposed between the valve of the valved nipple and the adjusting screw and having contact surfaces arranged to one side of the line of thrust between the screw and the valve, said halves having flared surfaces on the opposite side of said line of thrust, and a circular roller interposed between said flared portions and adapted to be held in place therein by a fusible material.

3. A sprinkler head for fire extinguishers, having a valved nipple, a distributer, an adjusting screw arranged opposite the valved nipple, a separable strut composed of like halves interposed between the valve of the valved nipple and the adjusting screw and having contact surfaces arranged to one side of the line of thrust between the screw and the valve, said halves having flared surfaces on the opposite side of said line of thrust, and a circular roller interposed between said flared portions and adapted to be held in place therein by a fusible material, said flared surfaces having cavities therein to aid in holding the fusible material in place.

In testimony whereof I have hereunto set my hand this 15th day of May A. D. 1912.

JOHN J. DALY.

Witnesses:
C. R. STURDIVANT,
C. J. MAIER.